(12) United States Patent
Robb et al.

(10) Patent No.: US 9,098,346 B2
(45) Date of Patent: Aug. 4, 2015

(54) CLOUD SERVICES LAYER DYNAMIC API

(75) Inventors: Terence A. Robb, Colorado Springs, CO (US); William M. Lacey, Colorado Springs, CO (US); Roger D. Harris, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 269 days.

(21) Appl. No.: 13/590,833

(22) Filed: Aug. 21, 2012

(65) Prior Publication Data

US 2014/0059194 A1 Feb. 27, 2014

(51) Int. Cl.
*G06F 9/50* (2006.01)
*G06F 15/173* (2006.01)

(52) U.S. Cl.
CPC ............ *G06F 9/5072* (2013.01); *G06F 15/173* (2013.01)

(58) Field of Classification Search
CPC ............................ G06F 9/5072; G06F 15/173
See application file for complete search history.

(56) References Cited

U.S. PATENT DOCUMENTS

| 2011/0153727 | A1* | 6/2011 | Li ................................. 709/203 |
| 2011/0258333 | A1* | 10/2011 | Pomerantz et al. ........... 709/229 |
| 2012/0242778 | A1* | 9/2012 | Ayers ......................... 348/14.09 |
| 2012/0266159 | A1* | 10/2012 | Risbood et al. ............... 717/177 |
| 2013/0111217 | A1* | 5/2013 | Kopasz et al. ................ 713/189 |

* cited by examiner

*Primary Examiner* — Ebrahim Golabbakhsh

(57) ABSTRACT

A network device receives a first file having a service-specific Application Programming Interface (API) definition for a first cloud service, and loads the service-specific API definition for the first cloud service into a Cloud Services Layer (CSL) API. The network device receives a service request involving the first cloud service, and handles, at the CSL API, the service request using the service-specific API definition for the first cloud service.

19 Claims, 13 Drawing Sheets

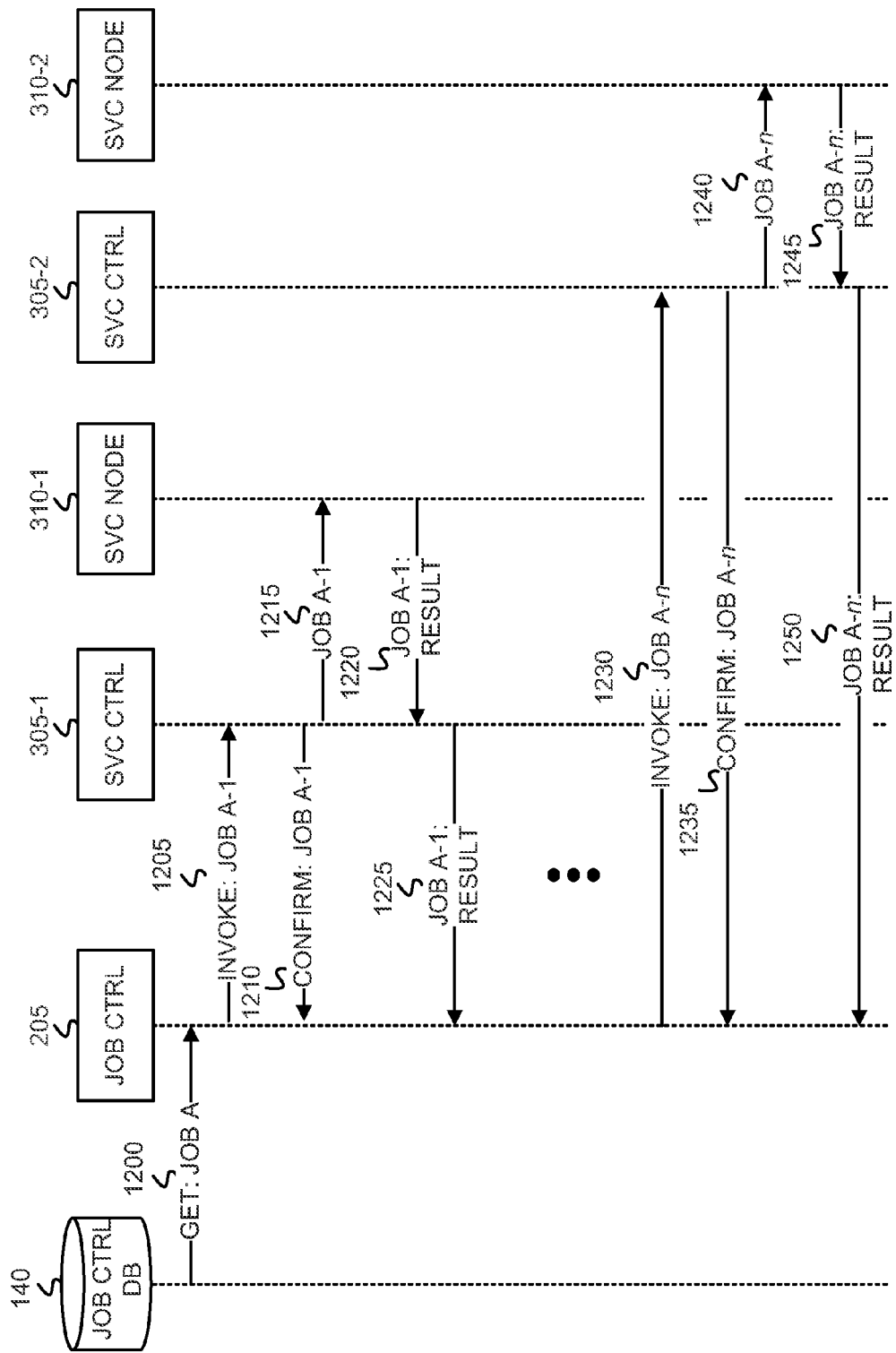

US 9,098,346 B2

CLOUD SERVICES LAYER DYNAMIC API

BACKGROUND

Cloud storage includes networked on-line storage where multiple virtual servers are used to store data. Operators of physical data centers virtualize their data storage resources and expose those virtualized resources to cloud storage customers as storage pools. The physical data centers may span multiple servers across multiple regions in the Internet. Cloud services involve the delivery of computing and storage capacity as services to multiple end users. For example, cloud services may include the provision of application software and/or databases as services to the end users. End users may access the cloud-based applications or databases through a web browser or a mobile application.

BRIEF DESCRIPTION OF THE DRAWINGS

FIGS. 11 and 12 are exemplary messaging diagrams associated with the exemplary process of FIG. 10.

DETAILED DESCRIPTION OF THE PREFERRED EMBODIMENTS

The following detailed description refers to the accompanying drawings. The same reference numbers in different drawings may identify the same or similar elements. The following detailed description does not limit the invention which is defined by the claims.

Figure 1A:
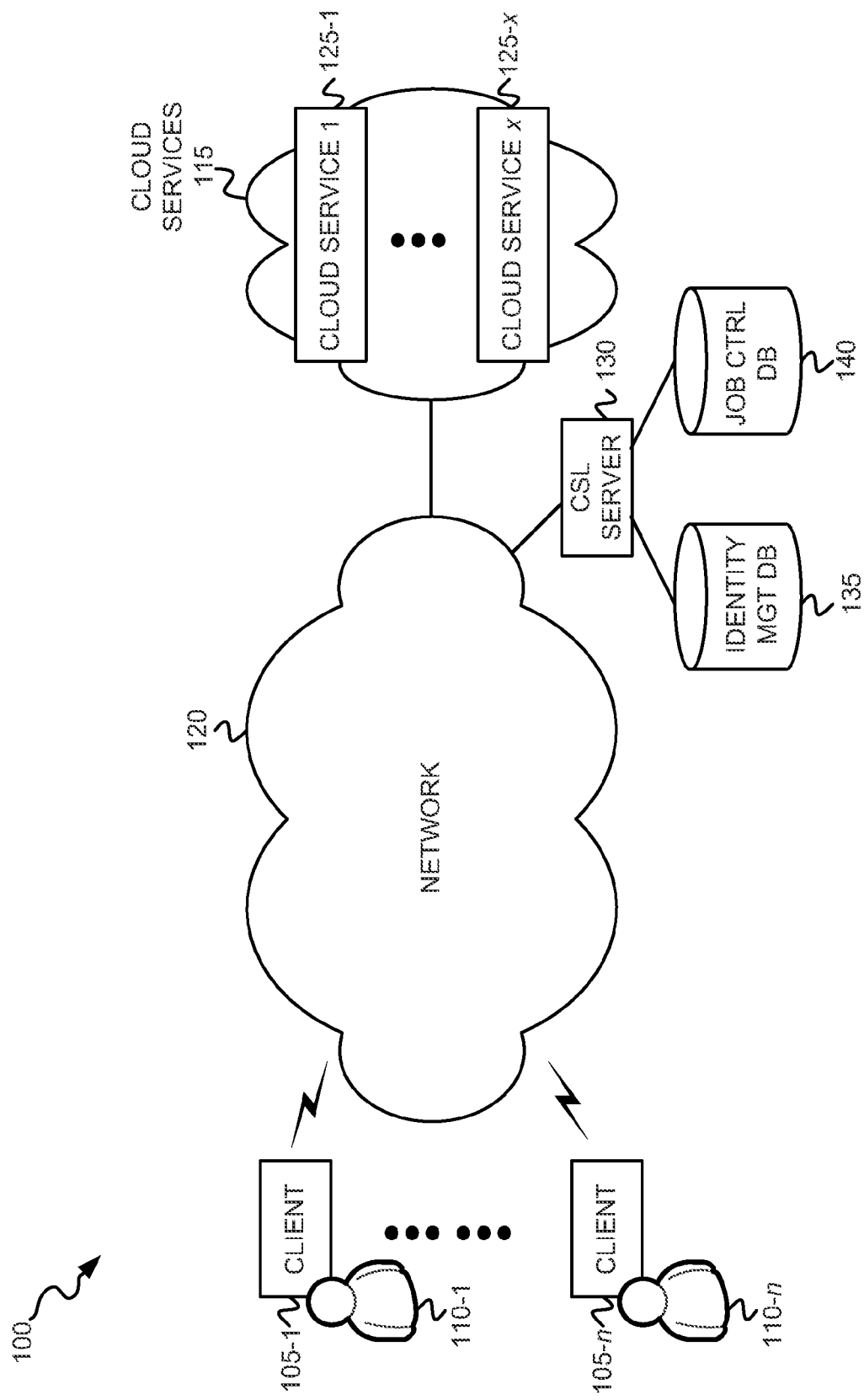
FIGS. 1A and 1B illustrate an exemplary network environment in which cloud services, accessible via a cloud services layer (CSL) with a dynamic Application Programming Interface (API), are implemented.

FIG. 1A illustrates an exemplary network environment 100 in which cloud services, accessible via a cloud services layer with a dynamic Application Programming Interface (API), are implemented. Network environment 100 may include multiple clients 105-1 through 105-n (with n being any integer greater than or equal to one), a network 120, cloud services 115, a Cloud Services Layer (CSL) server 130, an identity management (MGT) database (DB) 135, and a job control (CTRL) DB 140. Clients 105-1 through 105-n (generically referred to herein as "client 105"), CSL server 130 and cloud services 115 may connect with network 120 via wired or wireless links.

A respective user 110-1 through 110-n (generically referred to herein as "user 110") of cloud services may be associated with each client 105-1 through 105-n. For example, user 110-1 may be associated with (e.g., may use) client 105-1, etc. Each of clients 105-1 through 105-n may include, for example, a telephone (e.g., smart phone): a laptop, desktop, palmtop or tablet computer, a personal digital assistant (PDA); or other type of digital computing device that may communicate with CSL server 130 and/or cloud services 115 via network 120.

Network 120 may include one or more networks of various types. For example, network 120 may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet.

Cloud services 115 may include multiple cloud services 125-1 through 125-x (with x being any integer greater than or equal to one). Each of cloud services 125-1 through 125-x may include a cloud-based application or a cloud-based database that users 110-1 through 110-n may access via respective clients 105-1 through 105-n and CSL server 130. Each of cloud services 115 may be implemented in hardware, software, or a combination of hardware and software in a single device, or by multiple different devices (e.g., network devices, servers, etc.).

CSL server 130 may include one or more servers, computing devices, or network devices that control access to cloud services 115. CSL server 130 may receive service requests from clients 105-1 through 105-n, and may process those requests to create job submissions that may be serviced by one or more of cloud services 125-1 through 125-x.

Identity MGT DB 135 may include a data structure (e.g., a database) that stores information related to the identities of users 110-1 through 110-n and may include functionality for restricting access and control to cloud services 115 by users 110-1 through 110-n. Job CTRL DB 140 may include a data structure (e.g., a database) that stores information related to job submissions that are based on service requests received from clients 105-1 through 105-n.

The configuration of network components of network environment 100 illustrated in FIG. 1A is for illustrative purposes. Other configurations may be implemented. Therefore, network environment 100 may include additional, fewer and/or different components than those depicted in FIG. 1A.

Figure 1B:
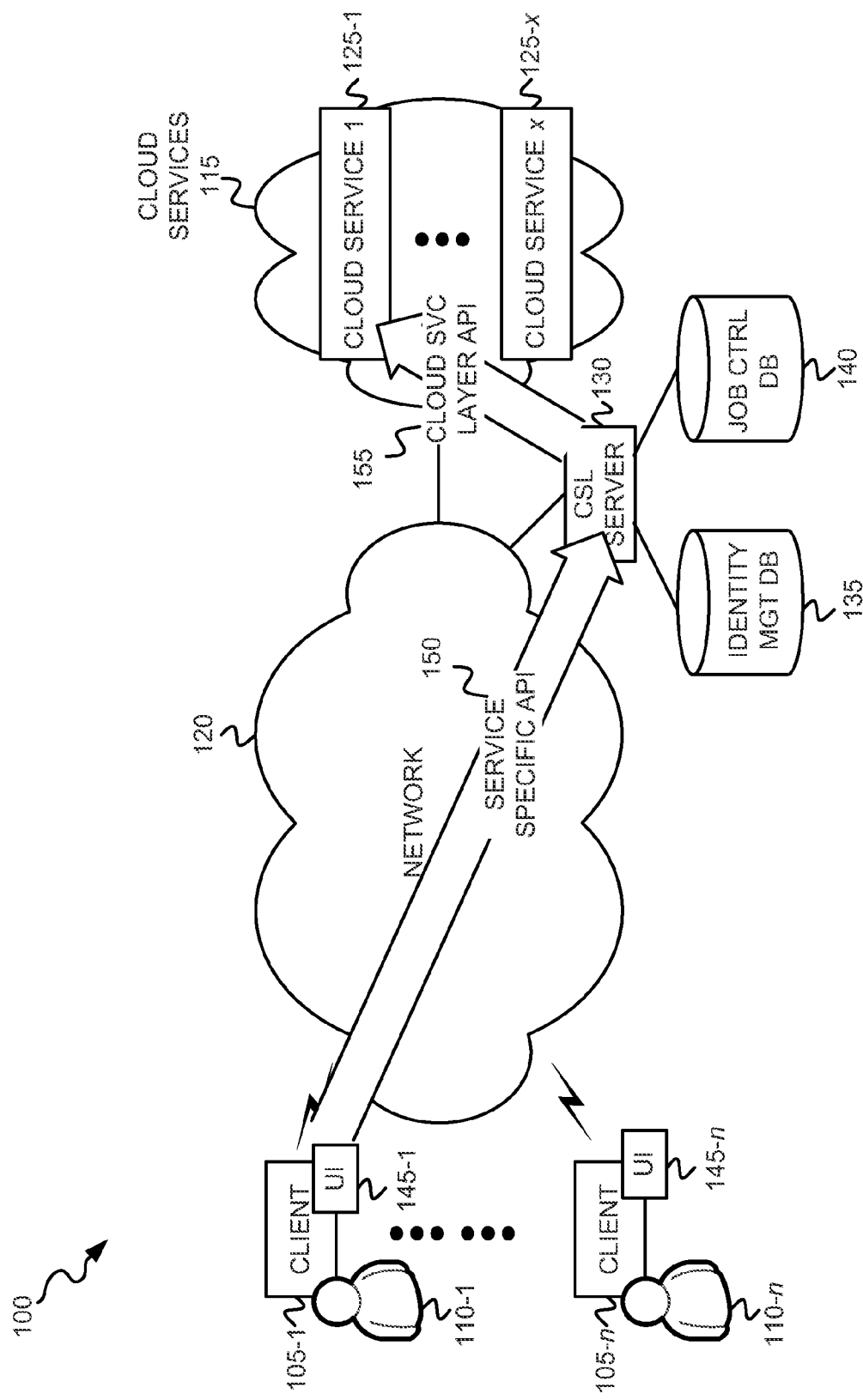

FIG. 1B depicts an exemplary implementation in which clients 105-1 through 105-n may use cloud services 115 via a respective user interface (UI) 145-1 through 145-n, a service specific Application Programming Interface (API), and CSL server 130. As shown in FIG. 1B, a client 105 may send a service request via a service specific API 150 to CSL server 130. In turn, CSL server 130, using a cloud services layer 155, may orchestrate the use of one or more cloud services 125-1 through 125-x to fulfill the service request received from client 105. CSL server 130 may implement one or more job controllers for controlling job submissions that are based on the service requests received from clients 105-1 through 105-n. The result(s) of the execution of the one or more of cloud services 115 may be returned (not shown) to client 105.

Figure 2:
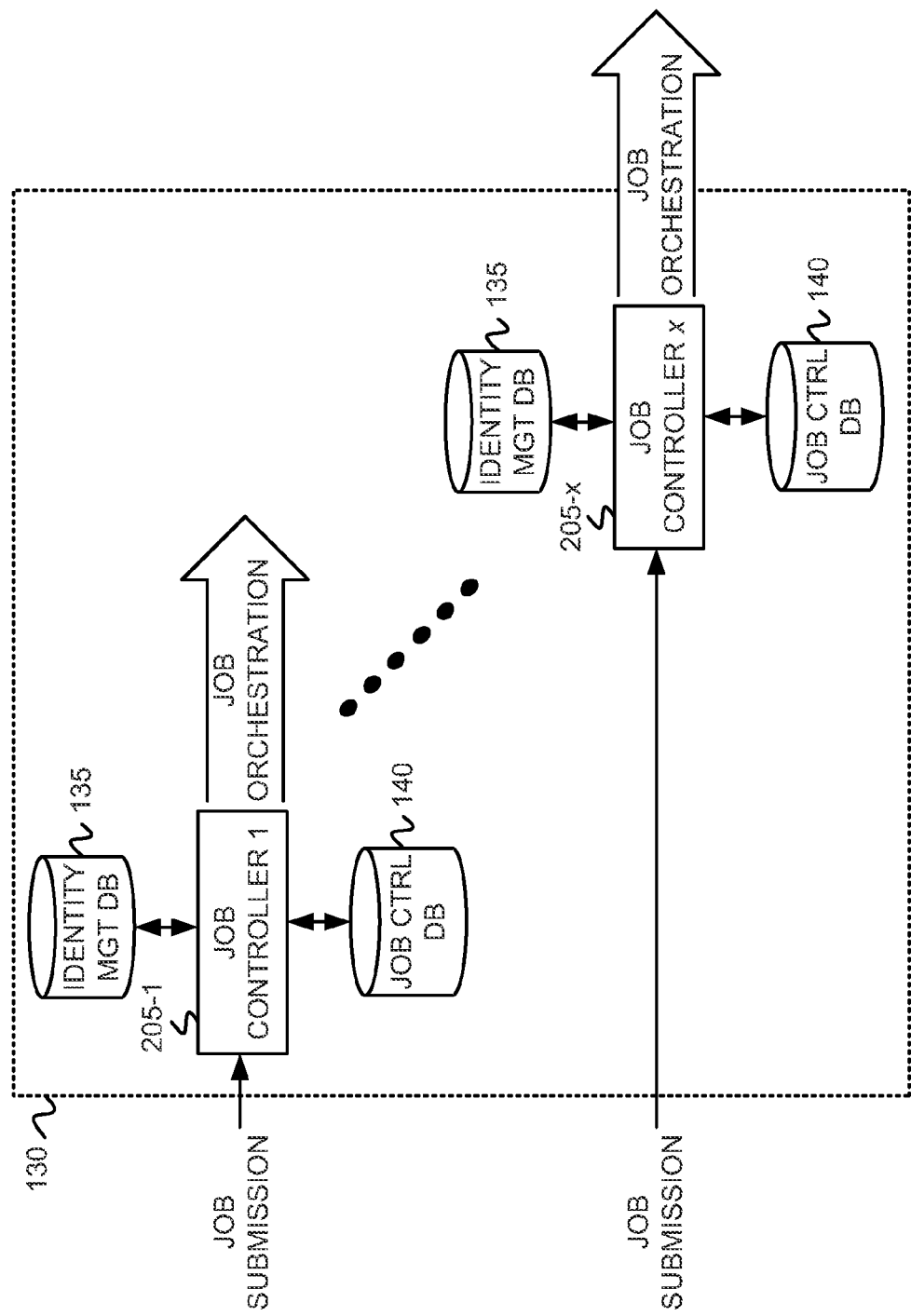
FIG. 2 is a diagram that illustrates exemplary components of the CSL server used for handling service requests received from the clients of FIGS. 1A and 1B.

FIG. 2 illustrates exemplary components of CSL server 130 used for handling service requests received from clients 105-1 through 105-n. CSL server 130 may include multiple job controllers 205-1 through 205-x (generically referred to herein as "job controller 205"). Each of job controllers 205-1 through 205-x may connect with identity MGT DB 135 and job CTRL DB 140 (shown replicated in FIG. 2 for clarity). Job controller 205 may receive a job submission from the CSL layer API and, based on look-ups into identity MGT DB 135 and job CTRL DB 140, may orchestrate execution of the job.

Figure 3:
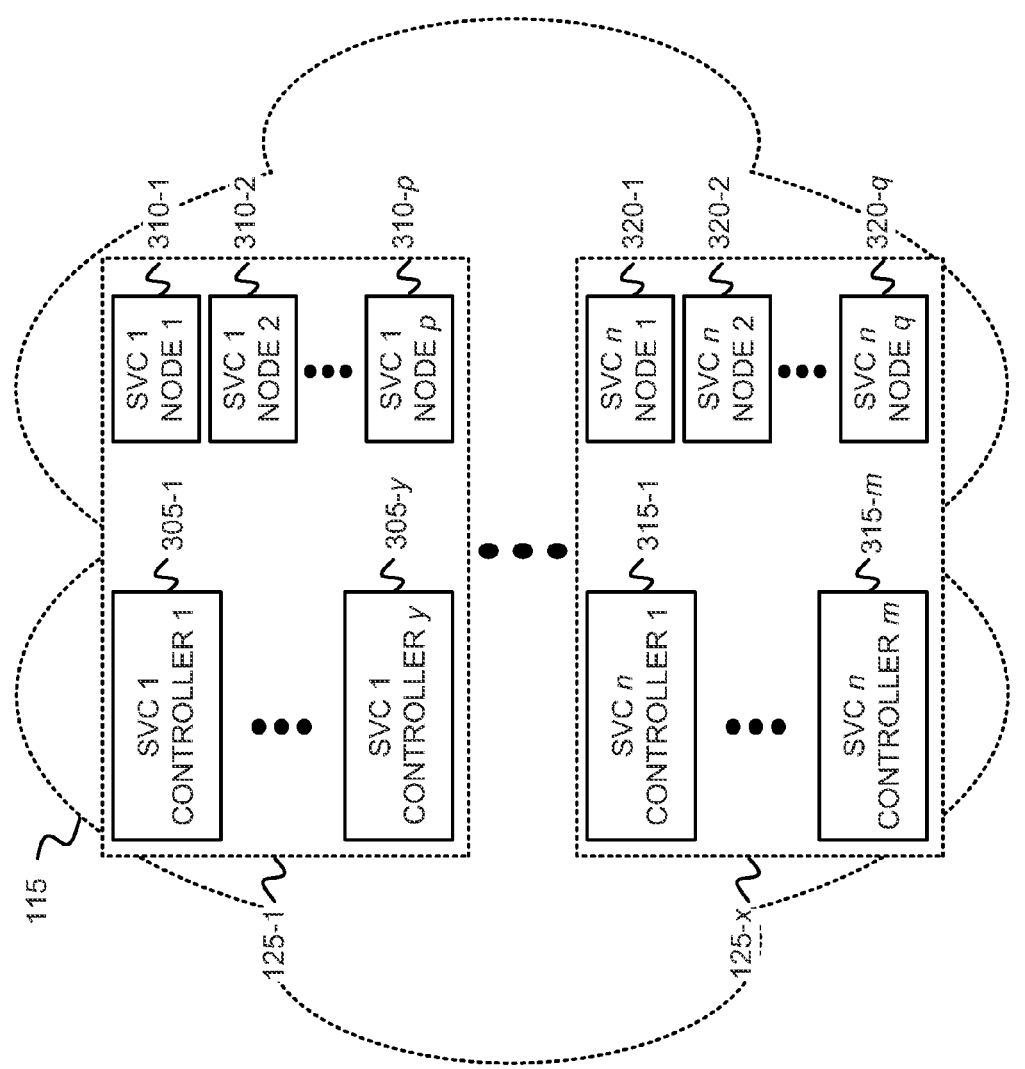
FIG. 3 is a diagram that depicts exemplary details of the cloud services of FIGS. 1A and 1B.

FIG. 3 depicts exemplary details of cloud services 125-1 through 125-x of cloud services 115. As shown, cloud services 125-1 may include one or more service controllers 305-1 through 305-y (with y being any integer greater than or equal to one), and one or more service nodes 310-1 through 310-p (with p being any integer greater than or equal to one). Each of service controllers 305-1 through 305-y may include a controller that controls the execution of a respective cloud service at one or more cloud service nodes that implement that cloud service. Each of service nodes 310-1 through 310-p may execute a specific cloud service that may include a cloud-based application or a cloud-based database.

As further shown, cloud services 125-x may include one or more service controllers 315-1 through 315-m (with y being any integer greater than or equal to one), and one or more service nodes 320-1 through 320-q (with q being any integer greater than or equal to one). Each of service controllers 305-1 through 305-m may include a controller entity that controls the execution of a respective cloud service at one or more cloud service nodes that implement that cloud service. Each of service nodes 320-1 through 320-q may execute a specific cloud service that may include a cloud-based application or a cloud-based database.

Figure 4:
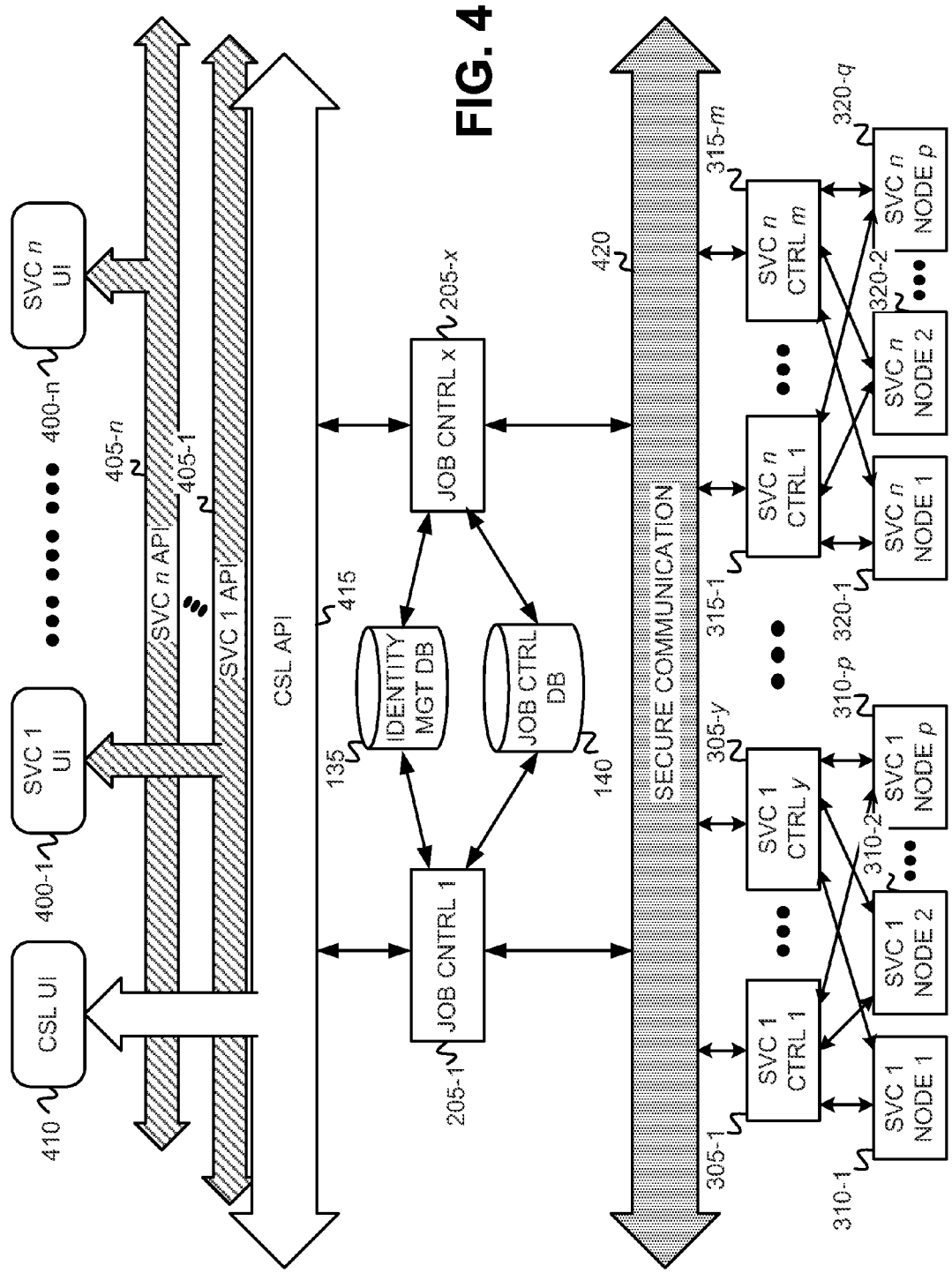
FIG. 4 is a diagram that depicts exemplary components and API layers involved in handling service requests.

FIG. 4 depicts the components and API's involved in handling service requests submitted via UIs at clients 105. As shown, service UIs 400-1 through 400-n (generically referred to as "SVC UI 400," and where n is any integer greater than one) may interact with a respective service API 405-1 through 405-n (generically referred to as "SVC API 405"). CSL UI 410 may interact with CSL API 415. As further described with respect to FIGS. 5 and 6 below, service requests submitted via SVC UI 400 may be handled as an API stream at SVC API 410 and then processed at CSL API 415 to generate a job submission for delivery to a selected one of job controllers 205-1 through 205-x. Job controllers 205-1 through 205-x, when a job is received, may orchestrate the execution of the job using secure communication 420 with service controllers 305-1 through 305-y and 315-1 through 315-m. Job processing and orchestration is described further with respect to FIGS. 5 and 6. Secure communication 420 may include encrypted communication between job controllers 205-1 through 205-x and service controllers 305-1 through 305-y and 315-1 through 315-m. Secure communication 420 may, for example, include communication in accordance with Simple Object Access Protocol (SOAP) or Representational State Transfer (REST).

Figure 5:
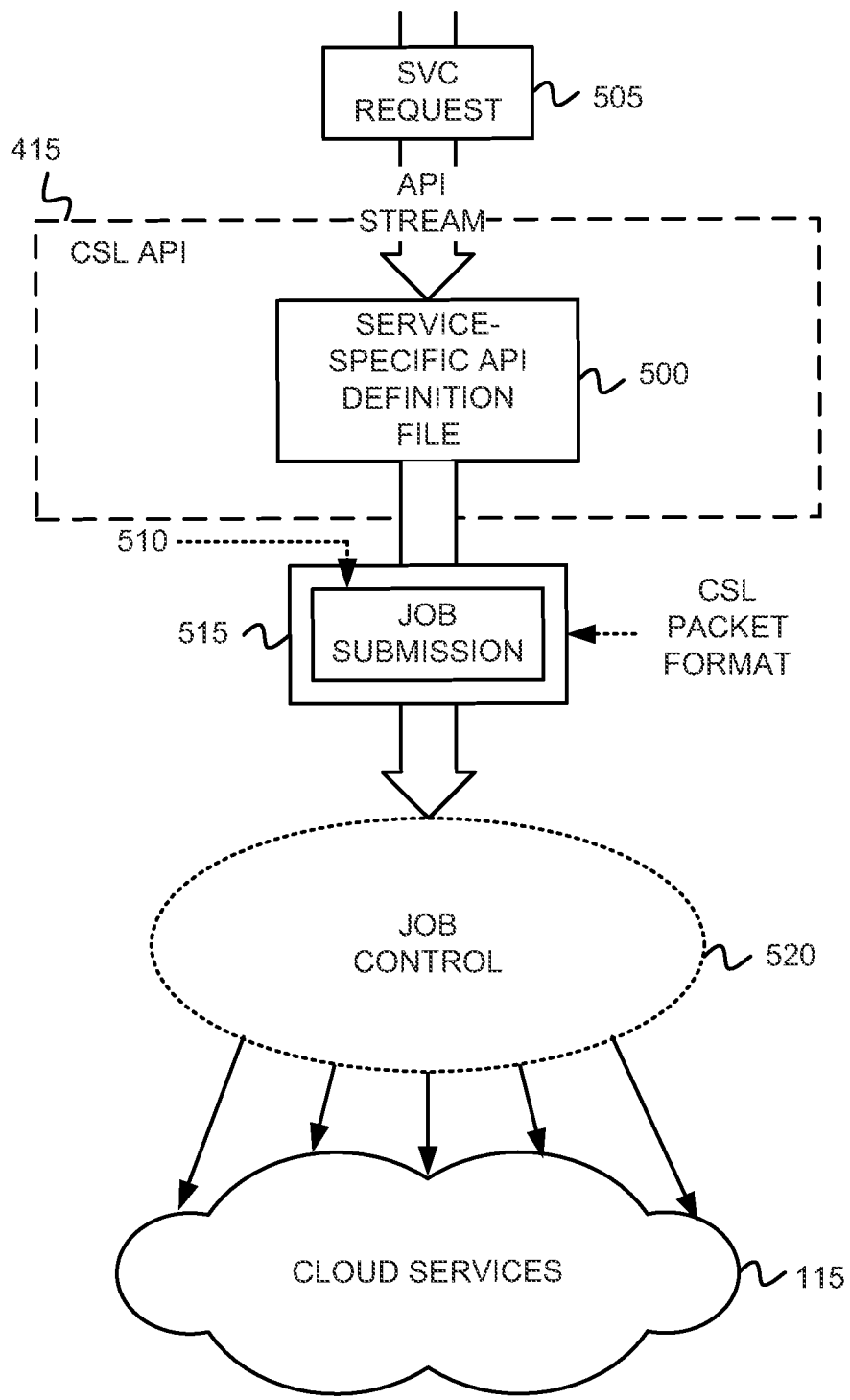
FIG. 5 is a diagram that illustrates the use of a service-specific API definition file, loaded into the CSL layer API layer of FIG. 4, for handling a service request in one embodiment.

FIG. 5 illustrates the use of a service-specific API definition file, loaded into CSL API 415, for handling a service request received at CSL API 415. As shown, CSL API 415 may receive a service request 505 in an API stream via an API call. The API call may be made in batch mode, where the API call is made, and the results of the service request are returned later after a batch of multiple service requests. The API call may also be made in interactive mode, where the API call is made, and the results of the single service request are returned immediately. The API call associated with service request 505 may include a SOAP API call or a REST API call. Service request 505 may include a service object and associated parameters. Service request 505 may also include Excel File Format (XLS), Extensible Markup Language (XML) and/or Comma Separated Value Format (CSV) files submitted as file streams through API calls. Upon receipt of service request 505, CSL API 415 may consult identity MGT DB 135 to establish the identity of the service requesting user 110, and to determine whether the requesting user 110 is authorized to access cloud services 115.

CSL API 415 may use instructions contained in the API definition of service specific API definition file 500 for packaging the request into a CSL layer packet format 515 as a job submission 510. API definition file 500 may, for example, include an Extensible Markup Language (XML) Schema Document (XSD) file. The XSD file may be used to express a set of rules to which a service request must conform. Other types of API definition files may alternatively be used.

CSL API 415 may submit job submission 510 for job control 520 such that the requested services can be executed by cloud services. Job control 520 may be implemented by one or more of job controllers 205-1 through 205-x and, as described with respect to FIG. 6, may include various aspects of job processing, including job creation, job fetching, job orchestration, service controller determination, and handling of service execution results.

Figure 6:
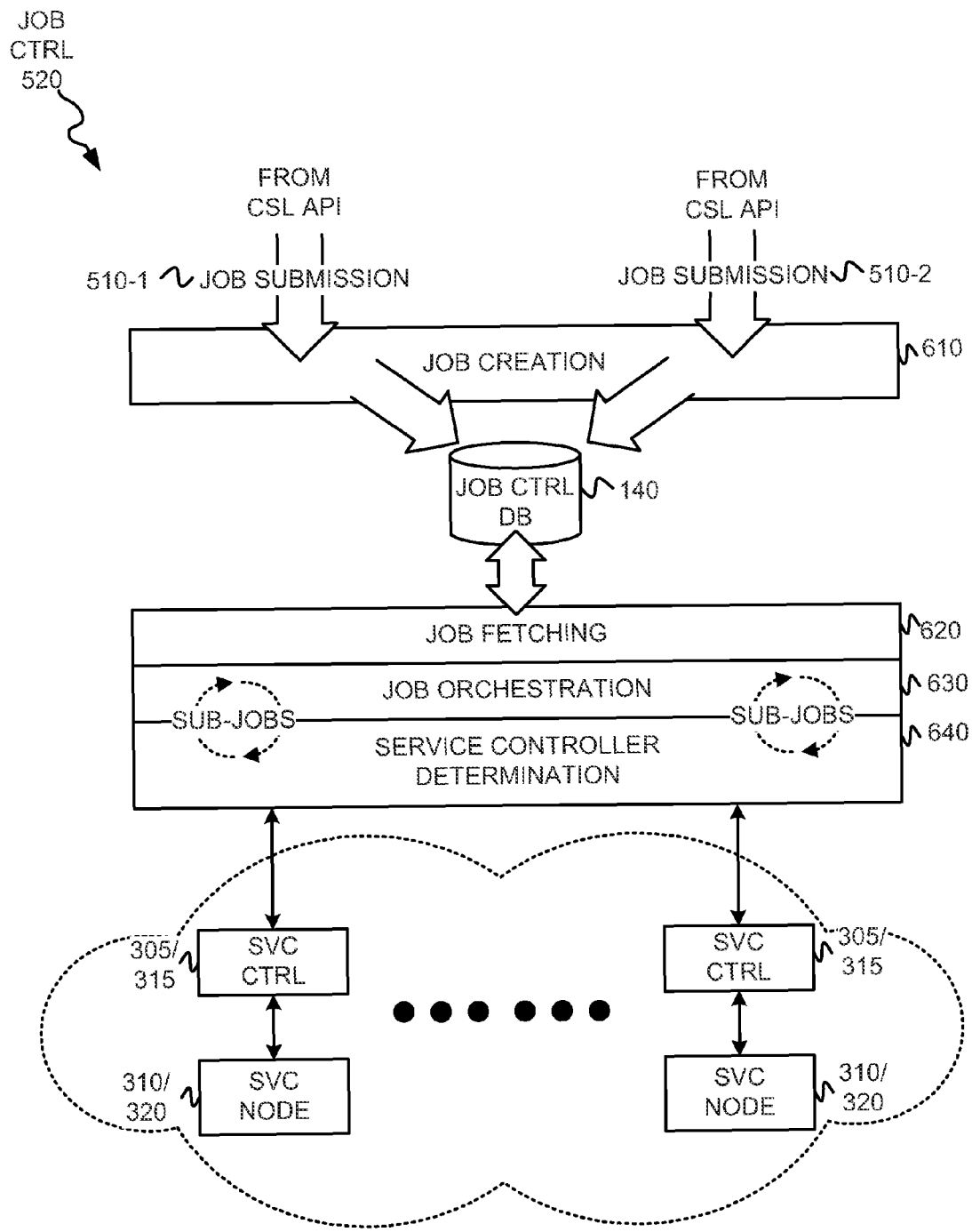
FIG. 6 is a diagram that depicts details of the job control of FIG. 5 according to an exemplary implementation.

FIG. 6 depicts details of job control 520 of FIG. 5 according to an exemplary implementation. Job control 520 may be performed by job controller 205 for each job submission 510 received from CSL API 415. As shown, job creation 610 may be performed for job submissions 510 (two job submissions 510-1 and 510-2 shown by way of example) received from CSL API 415. Job creation 610 may include generating the job that corresponds to the service requested by the job submission. Generating the job may include identifying sub-jobs that are components of the job, where the sub-jobs may involve the execution of multiple cloud services. For example, Job A may include sub-jobs A-1 and A-2, where sub-job A-1 involves the execution of cloud service 1 and sub-job A-2 involves the execution of cloud service 2. Job creation 610 may further include creating a unique identifier for each job and storing each job, including the sub-jobs, in job CTRL DB 140.

Job fetching 620 may include job controller 205 invoking a job by retrieving the job, including all of the sub-jobs, from storage in job CTRL DB 140. Job orchestration 630 may include job controller 205 identifying each sub-job of the job and determining a sequential order for the execution of each sub-job, such as, for example, executing the sub-jobs in sequence, or executing at least some of the sub-jobs in parallel and possibly others of the sub-jobs in sequence. Based on job orchestration 630, job controller 205 may perform service controller determination 640 to identify which service controller 305/315 to which each sub-job is to be sent for cloud service execution. Based on service controller determination 640, job controller 205 may send each sub-job to a determined service controller 305/315 which, in turn, may determine a cloud service node 310/320 for execution of the cloud service required by the sub-job. After execution of the cloud service by the determined cloud service node 310/320, service controller 305/315 may return the results of the cloud service execution for the sub-job to job controller 205. Job controller 205 may accumulate the results of the cloud service execution for all of the sub-jobs of the job. The accumulated results of the cloud service execution may be returned to CSL API 415 for further delivery to the requesting user 110 via network 120.

Figure 7:
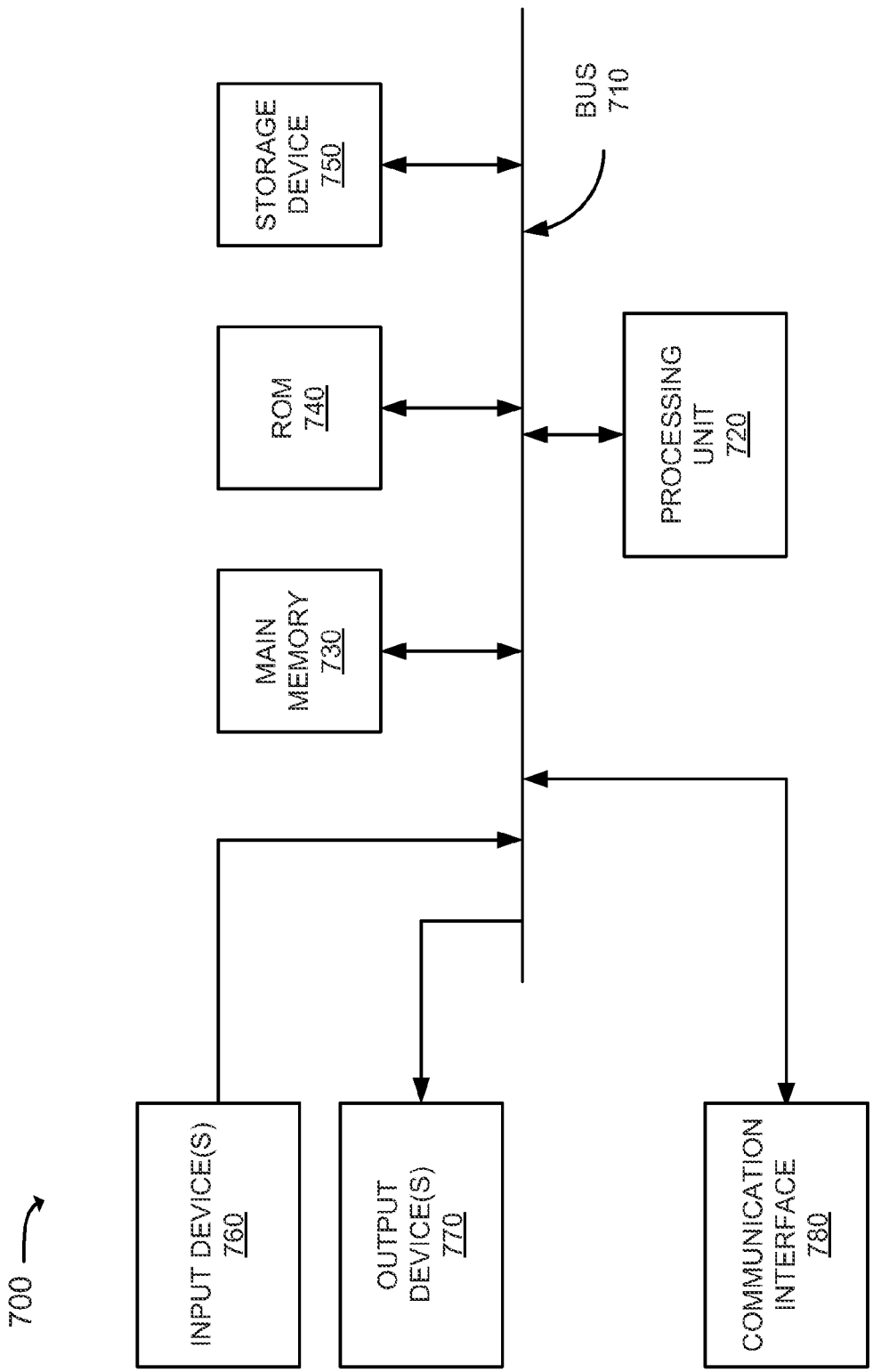
FIG. 7 is a diagram that depicts exemplary components of a device that may correspond to various devices of FIGS. 1A and 1B.

FIG. 7 is a diagram that depicts exemplary components of a device 700. Device 700 corresponds to clients 105-1 through 105-n, CSL server 130, identity MGT DB 135, job CTRL DB 140, service controllers 305-1 through 305-v and 315-1 through 315-m, service nodes 310-1 through 310-p and 320-1 through 320-q, and cloud services 125-1 through 125-x.

Device 700 may include a bus 710, a processing unit 720, a main memory 730, a read only memory (ROM) 740, a storage device 750, an input device(s) 760, an output device(s) 770, and a communication interface(s) 780. Bus 710 may include a path that permits communication among the elements of device 700.

Processing unit 720 may include one or more processors or microprocessors, or processing logic, which may interpret and execute instructions. Main memory 730 may include a random access memory (RAM) or another type of dynamic storage device that may store information and instructions for execution by processing unit 720. ROM 740 may include a ROM device or another type of static storage device that may store static information and instructions for use by processing unit 720. Storage device 750 may include a magnetic and/or optical recording medium. The process/methods set forth herein can be implemented as instructions that are stored in main memory 730, ROM 740 and/or storage device 750 for execution by processing unit 720.

Input device 760 may include one or more mechanisms that permit an operator to input information to device 700, such as, for example, a keypad or a keyboard, a display with a touch sensitive panel, voice recognition and/or biometric mechanisms, etc. Output device 770 may include one or more mechanisms that output information to the operator, including a display, a speaker, etc. Communication interface(s) 780 may include a transceiver that enables device 700 to communicate with other devices and/or systems. For example, communication interface(s) 780 may include wired or wireless transceivers for communicating via network 120.

The configuration of components of device 700 illustrated in FIG. 7 is for illustrative purposes. Other configurations may be implemented. Therefore, device 700 may include additional, fewer and/or different components than those depicted in FIG. 7.

Figure 8:
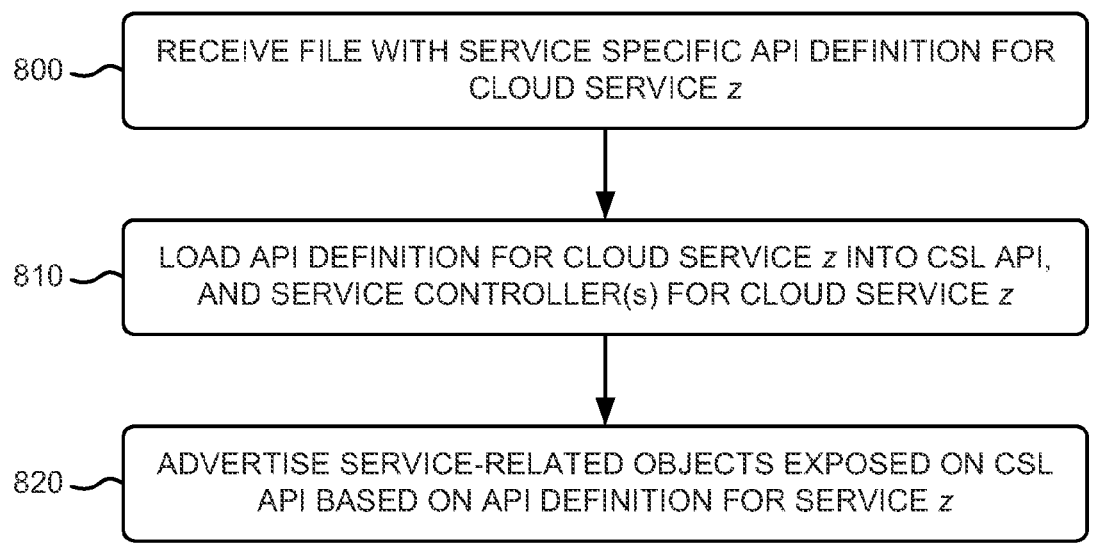
FIG. 8 is a flow diagram that illustrates an exemplary process for loading a file expressing a service specific API definition for a cloud service into a CSL API.

FIG. 8 is a flow diagram that illustrates an exemplary process for loading a file, which expresses a service specific API definition for a cloud service, into a CSL API. The exemplary process of FIG. 8 may be implemented by CSL server 130. The exemplary process of FIG. 8 is described below with reference to FIG. 9.

Figure 9:
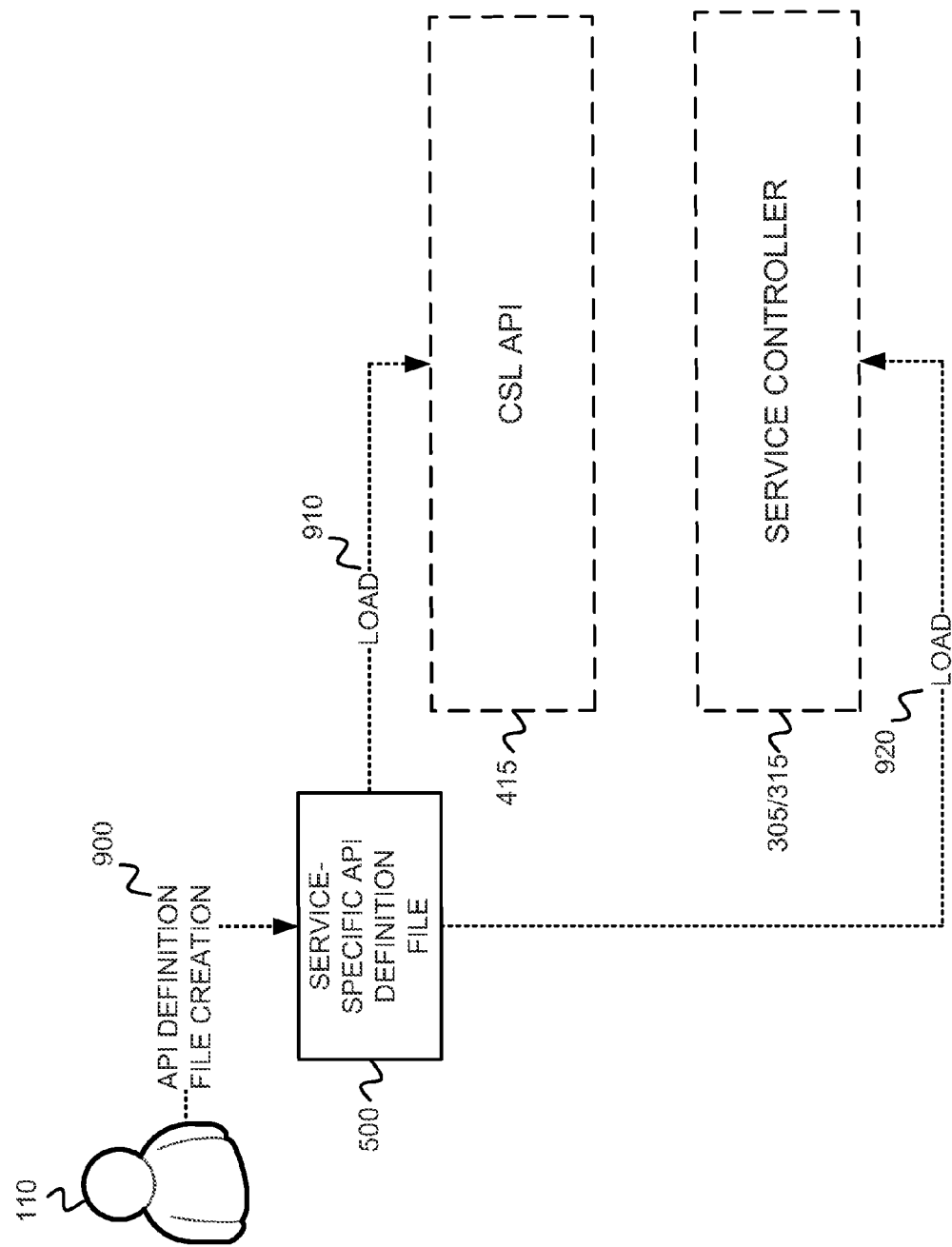
FIG. 9 is a diagram that graphically illustrates the exemplary process of FIG. 8.

The exemplary process may include receiving a file with a service-specific API definition for a service z (block 800). A user 110 at a client 105 may create an API definition file 500 such as, for example, an XSD file. The XSD file may be used to express a set of rules to which a service request for service z must conform. Other types of API definition files may alternatively be used. FIG. 9 depicts user 110 engaging in API definition file creation 900 to create service specific API definition file 500. Alternatively, an administrator of CSL server 130 may engage in API definition file creation 900.

CSL server 130 may load the service z API definition into CSL API 415 and into the service controller(s) for service z (block 810). FIG. 9 depicts API definition file being loaded 910 into CSL API 415 and being loaded 920 into an appropriate service controller 305/315 for service z. CSL API 415 and service controller 305/315 may subsequently use the service specific API definition file for handling service requests, and the jobs generated based on the service requests, for service z. CSL server 130 may advertise service-related objects exposed on CSL API 415 based on the service specific API definition for service z (block 820). CSL server 130 may advertise objects related to service z on CSL API 415 using instructions contained in the service specific API definition file for service z.

The exemplary process of FIG. 8 may be repeated for each service specific API definition for a cloud service of cloud services 125-1 through 125-x. Therefore, for each cloud service of cloud services 125-1 through 125-x, a service specific API definition for that cloud service may be received and loaded into CSL API 415. The exemplary process of FIG. 8 may also be used to load a revised API definition for a given cloud service. For example, a first service specific API definition file may be received and loaded into CSL API, and a subsequent revised version of the API definition file, that contains changes to the service specific API definition, may be received and loaded into CSL API 415 in place of the previous version. The exemplary process of FIG. 8 may, therefore, be used to maintain a dynamic CSL API, where service specific API definitions may be added to the CSL API as new cloud services are made available and where API definitions for existing cloud services may be revised and/or updated.

Figure 10:
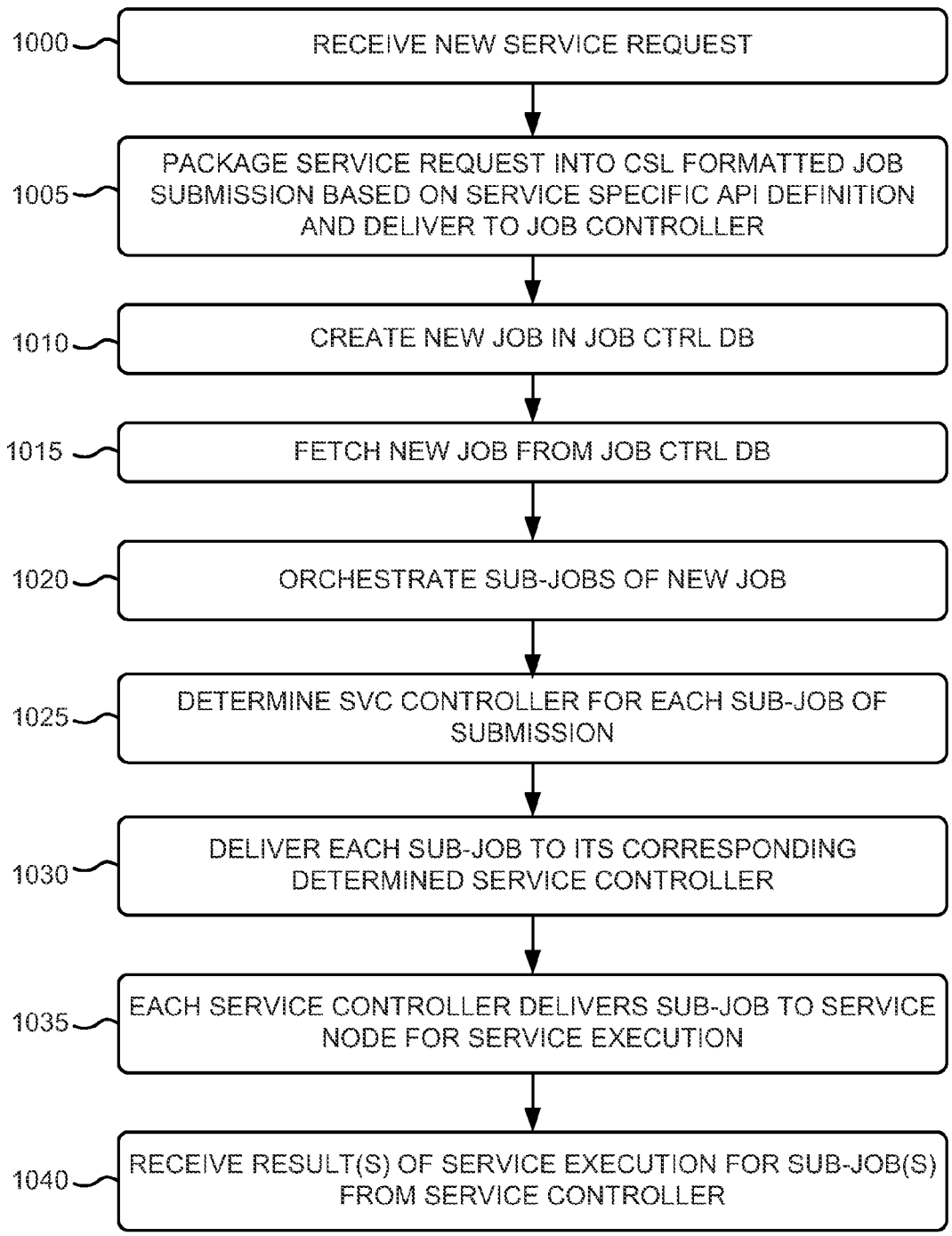
FIG. 10 is a flow diagram that illustrates an exemplary process for handling requests for use of cloud services.

FIG. 10 is a flow diagram that illustrates an exemplary process for handling requests for the use of cloud services. The exemplary process of FIG. 10 may be implemented by CSL server 130 in conjunction with cloud services 125-1 through 125-x. The exemplary process of FIG. 10 is described below with reference to the messaging diagrams of FIGS. 11 and 12.

Figure 11:
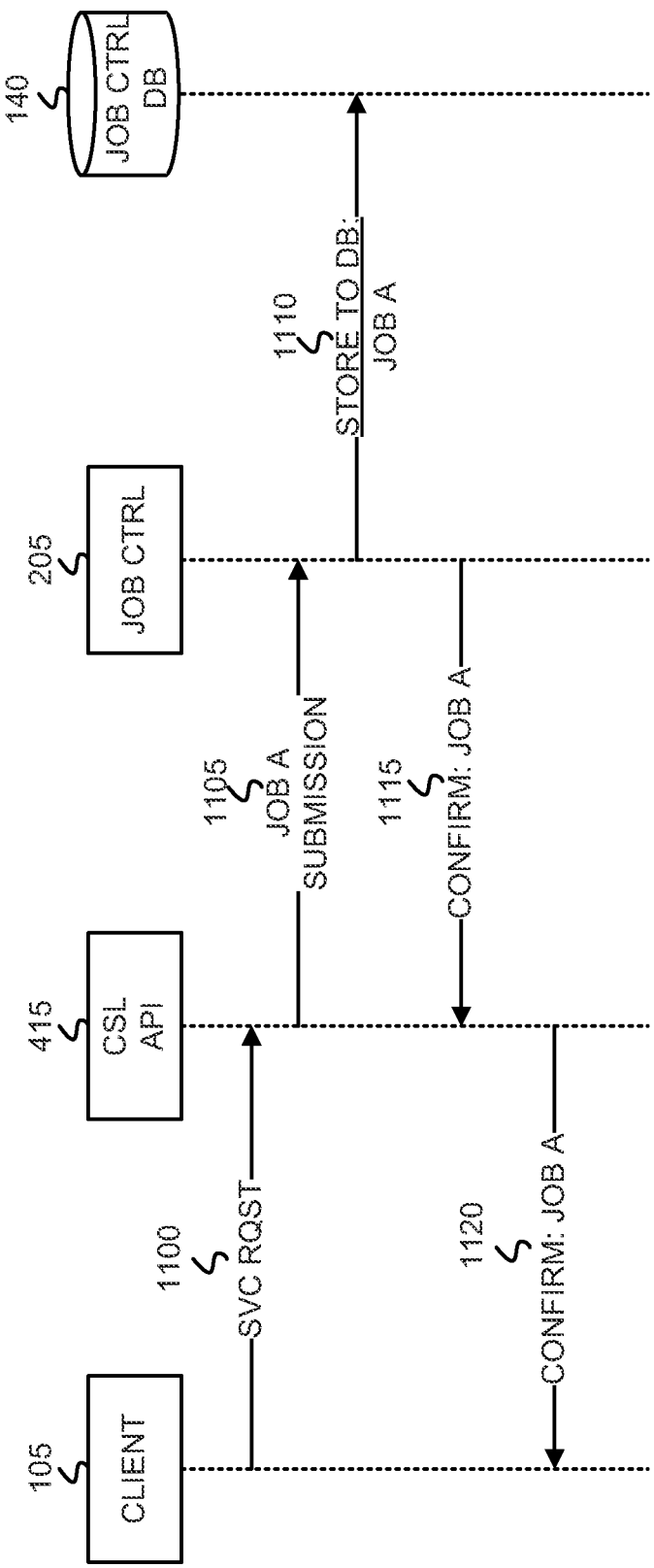

The exemplary process may include receiving a new service request (block 1000). A user 110 at a client 105 may generate a new request for a cloud service, using UI 145, and may submit the request to CSL server 130 via network 120. The messaging diagram of FIG. 11 depicts client 105 sending a service request 1100 to CSL API 415 of CSL server 130

CSL API 415 may package the service request into a CSL formatted job submission based on a service-specific API definition and may deliver the job submission to a job controller 205 (block 1005). CSL API 415 may package the service request into a CSL job submission as described above with respect to FIG. 5. FIG. 11 depicts CSL API 415 sending a submission 1105 for Job A to job controller 205.

Job controller 205 may create a new job in job control DB 140 (block 1010). Job controller 205 may generate a new job that corresponds to the service(s) requested by the job submission. Generating the job may include identifying sub-jobs that are components of the job that may involve the execution of multiple cloud services. For example, Job A may include sub-jobs A-1 and A-2, where sub-job A-1 involves the execution of cloud service 1 and sub-job A-2 involves the execution of cloud service 2. Job controller 205 may create a unique identifier for each job and store each job, including the sub-jobs, in job CTRL DB 140. FIG. 11 depicts job controller 205 storing 1110 Job A in job CTRL DB 140, and returning a confirmation message 1115 to CSL API 415 confirming the creation of a new job that corresponds to the received service request. In turn, as further shown in FIG. 11, CSL API 415 may return a confirmation message 1120 to client 105 confirming the creation of the new job that corresponds to the service request 1100 sent by client 105.

Job controller 205 may fetch the new job from job CTRL DB 140 (block 1015). Job fetching may include job controller 205 invoking a job by retrieving the job, including all of the job's sub-jobs, from storage in job CTRL DB 140. FIG. 11 depicts job controller 205 retrieving Job A from job CTRL DB 140 via a message 1200.

Job controller 205 may orchestrate the sub-jobs of the new job (block 1020). Orchestration may include job controller 205 identifying each sub-job of the new job and determining a sequence of execution of each sub-job such as executing the sub-jobs in sequence, or executing at least some of the sub-jobs in parallel and possibly others of the sub-jobs in sequence.

Job controller 205 may determine the service controller for each sub-job of the job submission (block 1025). Based on the job orchestration of block 1020, job controller 205 may identify which service controller 305/315 to which each sub-job of the job is to be sent for cloud service execution. Job controller 205 may deliver each sub-job to its corresponding service controller determined in block 1025 (block 1030). In the example depicted in FIG. 12, Job A consists of n sub-jobs (i.e., sub-job A-1, sub-job A-2, . . . sub-job A-n). As further shown in FIG. 12, job controller 205 sends a job invocation message 1205 for sub-job A-1 to service controller 305-1 and service controller 305-1 may return a job confirmation message 1210 confirming the receipt of sub-job A-1. FIG. 12 depicts job controller 205 sending a subsequent job invocation message 1230 for sub-job A-n to service controller 305-2, and service controller 305-2 returning a confirmation message 1235 for sub-job A-n.

Each service controller may deliver a received sub-job to a service node for service execution (block 1035). Each service controller 305/315 receiving a sub-job from job controller 205 may determine a cloud service node 310/320 for execution of the cloud service required by the sub-job, and may then deliver the sub-job to the determined cloud service node 310/320. FIG. 12 depicts service controller 305-1 sending sub-job A-1 1215 to cloud service node 310-1, and service controller 305-2 sending sub-job A-n 1240 to cloud service node 310-2.

Job controller 205 may receive the result(s) of the service execution for each sub-job(s) from each service controller (block 1040). After execution of the cloud service(s) by the determined cloud service node(s) 310/320, service controller 305/315 may return the results of the cloud service execution for the sub-jobs to job controller 205. Job controller 205 may accumulate the results of the cloud service execution for all of the sub-jobs of the job. FIG. 12 depicts service node 310-1, after execution of a cloud service, returning a result 1220 for sub-job A-1 to service controller 305-1, and, in turn, service controller 305-1 may return a result 1225 of the sub-job A-1 to job controller 205. FIG. 12 further depicts service node 310-2, after execution of a cloud service, returning a result 1245 for sub-job A-2 to service controller 305-2, and, in turn, service controller 305-2 may return a result 1250 of the sub-job A-2 to job controller 205. Job controller 205 may return the accumulated result(s)s of the cloud service execution to CSL API 415 for further delivery to the requesting user 110 via network 120.

The exemplary process of FIG. 10 may be repeated for each service request received at CSL server 130 from clients 105-1 through 105-n.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8 and 10, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, at a cloud services layer (CSL) Application Programming Interface (API), a first file having a service-specific API definition for a first cloud service;
   loading the service-specific API definition for the first cloud service into the CSL API;
   receiving, at the CSL API from a client associated with a user, a service request in an API stream via an API call included in a batch of multiple service requests;
   consulting, by the CSL API, a database, storing information related to identities of a plurality of users and functionalities for restricting access to and control of a plurality of cloud services, to identify the user;
   determining, at the CSL API, whether the identified user is authorized to access the first cloud service; and
   handling, at the CSL API and based on a determination that the identified user is authorized to access the first cloud service, the service request involving the first cloud service using the service-specific API definition for the first cloud service.

2. The method of claim 1, further comprising:
   receiving, at the CSL API, a second file having a revised service-specific API definition for the first cloud service which contains changes to the service-specific API definition;
   loading the revised service-specific API definition for the first cloud service into the CSL API to replace the previous service-specific API definition for the first cloud service; and
   handling, at the CSL API, another service request involving the first cloud service using the revised service-specific API definition for the first cloud service.

3. The method of claim 1, further comprising:
   receiving, at the CSL API, a second file having a service-specific API definition for a second cloud service;
   loading the service-specific API definition for the second cloud service into the CSL API; and
   handling, at the CSL API, a service request involving the second cloud service using the service-specific API definition for the second cloud service.

4. The method of claim 1, wherein handling the service request involving the first cloud service comprises:
   packaging the first service request involving the first cloud service into a CSL format, based on the service-specific API definition for the first cloud service, to generate a job submission.

5. The method of claim 4, wherein handling the service request involving the first cloud service further comprises:

delivering the job submission from the CSL API to a job controller, receiving, from the job controller, a confirmation message indicating creation of a job corresponding to the service request, and sending the confirmation message to the client device.

6. The method of claim 5, further comprising:

orchestrating, at the job controller, the job to cause a service node to execute the first cloud service based on the job submission.

7. The method of claim 6, further comprising:

determining a service controller associated with the first cloud service; and delivering at least a portion of the job to the determined service controller for execution by the first cloud service.

8. The method of claim 1, wherein receiving a service request comprises:

receiving a representational state transfer (REST) API call.

9. A network device, comprising:

a communication interface coupled to a network;

a processing unit configured to implement a cloud services layer (CSL) Application Programming Interface (API) and to:

receive, via the communication interface, a first file having a service-specific API definition for a first cloud service, load the service-specific API definition for the first cloud service into the CSL API, receive, via the communication interface, a service request involving the first cloud service, wherein the service request is in an API stream via an API call included in a batch of multiple service requests and received from a client associated with a user, consult a database, storing information related to identities of a plurality of users and functionalities for restricting access to and control of a plurality of cloud services, to identify the user;

determine whether the identified user is authorized to access the first cloud service; and handle, at the CSL API and based on a determination that the identified user is authorized to access the first cloud service, the service request using the service-specific API definition for the first cloud service.

10. The device of claim 9, where the processing unit is further configured to:

receive, via the communication interface, a second file having a revised service-specific API definition for the first cloud service, load the revised service-specific API definition for the first cloud service into the CSL API to replace the previous service-specific API definition for the first cloud service, receive, via the communication interface, another service request involving the first cloud service, and handle, at the CSL API, the other service request using the revised service-specific API definition for the first cloud service.

11. The network device of claim 9, where the processing unit is further configured to:

receive, via the communication interface, a second file having a service-specific API definition for a second cloud service, load the service-specific API definition for the second cloud service into the cloud services API layer, receive, via the communication interface, a service request involving the second cloud service, and handle, at the CSL API, the service request involving the second cloud service using the service-specific API definition.

12. The network device of claim 9, wherein, when handling the service request involving the first cloud service, the processing unit is further configured to:

package the service request involving the first cloud service into a cloud services layer (CSL) format, based on the service-specific API definition for the first cloud service, to generate a job submission.

13. The network device of claim 12, wherein the processing unit is further configured to implement one or more job controllers and wherein, when handling the service request involving the first cloud service, the processing unit is further configured to:

deliver the job submission to one of the one or more job controllers, receive, from the job controller, a confirmation message indicating creation of a job corresponding to the service request, and send the confirmation message to the client device.

14. The network device of claim 13, wherein the processing unit, when implementing the one of the one or more job controllers, is configured to:

orchestrate the job to cause a service node to execute the first cloud service based on the job submission.

15. The network device of claim 14, wherein the processing unit, when implementing the one of the one or more controllers, is configured to:

determine a service controller associated with the first cloud service, and deliver at least a portion of the job to the determined service controller for execution by the first cloud service.

16. A non-transitory computer-readable medium containing instructions executable by at least one processor, the computer-readable medium comprising:

one or more instructions for receiving a first file having a service-specific Application Programming Interface (API) definition for a first cloud service;

one or more instructions for loading the service-specific API definition for the first cloud service into a cloud services layer (CSL) API;

one or more instructions for receiving a service request involving the first cloud service, wherein the first service request is in an API stream via an API call included in a batch of multiple service requests and received from a client associated with a user;

one or more instructions for consulting a database, storing information related to identities of a plurality of users and functionalities for restricting access to and control of a plurality of cloud services, to identify the user;

one or more instructions for determining whether the identified user is authorized to access the first cloud service; and one or more instructions for handling, at the CSL API and based on a determination that the identified user is authorized to access the first cloud service, the service request using the service-specific API definition for the first cloud service.

17. The non-transitory computer-readable medium of claim 16, further comprising:

one or more instructions for receiving a second file having a revised service-specific API definition for the first cloud service;

one or more instructions for loading the revised service-specific API definition for the first cloud service into the CSL API to replace the previous service-specific API definition for the first cloud service;
one or more instructions for receiving another service request involving the first cloud service; and
one or more instructions for handling, at the CSL API, the other service request using the revised service-specific API definition for the first cloud service.

18. The non-transitory computer-readable medium of claim 16, further comprising:
one or more instructions for receiving a second file having a service-specific API definition for a second cloud service;
one or more instructions for loading the service-specific API definition for the second cloud service into the cloud services API layer,
one or more instructions for receiving a service request involving the second cloud service, and
one or more instructions for handling, at the cloud services layer API, the service request involving the second cloud service using the service-specific API definition.

19. The non-transitory computer-readable medium of claim 16, further comprising:
one or more instructions for packaging the service request involving the first cloud service into a CSL format, based on the service-specific API definition for the first cloud service, to generate a job submission.

* * * * *